(12) United States Patent
Yosinski et al.

(10) Patent No.: US 10,726,335 B2
(45) Date of Patent: Jul. 28, 2020

(54) GENERATING COMPRESSED REPRESENTATION NEURAL NETWORKS HAVING HIGH DEGREE OF ACCURACY

(71) Applicant: Uber Technologies, Inc., San Francisco, CA (US)

(72) Inventors: Jason Yosinski, San Francisco, CA (US); Chunyuan Li, San Francisco, CA (US); Ruoqian Liu, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/172,166

(22) Filed: Oct. 26, 2018

(65) Prior Publication Data

US 2019/0130272 A1    May 2, 2019

Related U.S. Application Data

(60) Provisional application No. 62/577,662, filed on Oct. 26, 2017.

(51) Int. Cl.
*G05D 1/00* (2006.01)
*G06F 17/16* (2006.01)
(Continued)

(52) U.S. Cl.
CPC .......... *G06N 3/082* (2013.01); *G05D 1/0088* (2013.01); *G06F 17/16* (2013.01); *G06N 3/0454* (2013.01); *G06N 3/08* (2013.01)

(58) Field of Classification Search
None
See application file for complete search history.

(56) References Cited

U.S. PATENT DOCUMENTS 5,548,512 A  *  8/1996  Quraishi ............. G05D 1/0255
                                                              701/23
10,229,356 B1 * 3/2019  Liu ......................... G06N 3/08
(Continued)

FOREIGN PATENT DOCUMENTS

WO    WO 2017/151203 A1    9/2017

OTHER PUBLICATIONS

Yang, Zichao, et al. "Deep fried convnets." Proceedings of the IEEE International Conference on Computer Vision. 2015. (Year: 2015).*
(Continued)

*Primary Examiner* — Li B. Zhen
*Assistant Examiner* — Markus A. Vasquez
(74) *Attorney, Agent, or Firm* — Fenwick & West LLP (57) ABSTRACT

Machine learning based models, for example, neural network models employ large numbers of parameters, from a few million to hundreds of millions or more. A machine learning based model is trained using fewer parameters than specified. An initial parameter vector is initialized, for example, using random number generation based on a seed. During training phase, the parameter vectors are modified in a subspace around the initial vector. The trained model can be stored or transmitted using seed values and the trained parameter vector in the subspace. The neural network model can be uncompressed using the seed values and the trained parameter vector in the subspace. The compressed representation of neural networks may be used for various applications such as generating maps, object recognition in images, processing of sensor data, natural language processing, and others.

28 Claims, 7 Drawing Sheets

(51) Int. Cl.
*G06N 3/08* (2006.01)
*G06N 3/04* (2006.01)

(56) References Cited

U.S. PATENT DOCUMENTS

| | | | |
|---|---|---|---|
| 2005/0114280 A1 | 5/2005 | Rising | |
| 2014/0180986 A1 | 6/2014 | Hinton et al. | |
| 2015/0278634 A1* | 10/2015 | Kato | G06K 9/4628 |
| | | | 382/197 |
| 2016/0217369 A1 | 7/2016 | Annapureddy et al. | |
| 2017/0286830 A1 | 10/2017 | El-Yaniv et al. | |
| 2018/0239992 A1* | 8/2018 | Chalfin | G06K 9/66 |

OTHER PUBLICATIONS

Cheng, Yu, et al. "An exploration of parameter redundancy in deep networks with circulant projections." Proceedings of the IEEE International Conference on Computer Vision. 2015. (Year: 2015).*

Pfenning, Frank. "Lecture Notes on Binary Search". 15-122: Principles of Imperative Computation. Aug. 31, 2010. (Year: 2010).*

Werneth, Charles M., et al. "Numerical gram—schmidt orthonormalization." European Journal of Physics 31.3 (2010): 693. (Year: 2010).*

Dauphin, Y. et al., "Big Neural Networks Waste Capacity," Mar. 14, 2013, pp. 1-5.

Dauphin, Y. et al., "Identifying and attacking the saddle point problem in high-dimensional nonconvex optimization," Jun. 10, 2014, pp. 1-14.

Denil, M. et al., "Predicting Parameters in Deep Learning," Advances in Neural Information Processing Systems 26 (NIPS 2013), Dec. 2013, pp. 2148-2156.

Glorot, X. et al., "Understanding the Difficulty of Training Deep Feedforward Neural Networks" Proceedings of the 13th International Conference on Artificial Intelligence and Statistics (AISTATS) 2010, May 2010, pp. 249-256.

Goodfellow, I. et al., "Qualitatively Characterizing Neural Network Optimization Problems," International Conference on Learning Representations, Dec. 2014, pp. 1-20.

Han, S. et al., "Deep Compression: Compressing Deep Neural Networks with Prunin, Trained Quantization and Huffman Coding," ICLR 2016, Feb. 15, 2016, pp. 1-14.

He, K. et al., "Delving Deep into Rectifiers: Surpassing Human-Level Performance on ImageNet Classification," IEEE International Conference on Computer Vision (ICCV), Dec. 2015, pp. 1026-1034.

Kingma, D. et al., "Adam: A method for stochastic optimization," International Conference on Learning Representations, May 2015, pp. 1-15.

Le, Q. et al., "Fastfood—Approximating Kernel Expansions in Loglinear Time," Proceedings of the 30th International Conference on Machine Learning, Jun. 2013, pp. 244-252.

Li, P. et al., "Very Sparse Random Projections," 12th ACM SIGKDD International Conference on Knowledge Discovery and Data Mining, Aug. 2006, pp. 1-10.

Wen, W. et al., " Learning structured sparsity in deep neural networks," 30th Conference on Neural Information Processing Systems (NIPS 2016), Dec. 2016, pp. 1-9.

Yang, Z. et al., "Deep Fried Convnets," Proceedings of the 2015 IEEE International Conference on Computer Vision (ICCV), Dec. 2015, pp. 1476-1483.

Zhang, C. et al., "Understanding deep learning requires rethinking generalization," ICLR 2017, Apr. 2017, pp. 1-15.

PCT International Search Report and Written Opinion, PCT Application No. PCT/IB2018/058410 , dated Feb. 20, 2019, 11 pages.

\* cited by examiner

GENERATING COMPRESSED REPRESENTATION NEURAL NETWORKS HAVING HIGH DEGREE OF ACCURACY

CROSS REFERENCE TO RELATED APPLICATIONS

This application claims the benefit of priority under 35 USC 119(e) to U.S. Provisional Application No. 62/577,662 filed on Oct. 26, 2017, which is incorporated herein by reference in its entirety for all purposes.

BACKGROUND

1. Technical Field

The subject matter described generally relates to generation of machine learning based models, and in particular to generating compressed representations of neural networks having high degree of accuracy.

2. Background Information

Machine learning describes a wide range of algorithms by which a computer can learn to solve a problem without being explicitly programmed. One class of machine learning algorithm is artificial neural networks. An artificial neural network comprises a set of interconnected nodes. One or more input nodes receive external input data. The input nodes apply an activation function to the input and may output the result to one or more other nodes (referred to as "hidden nodes").

The hidden nodes receive input from one or more previous nodes (i.e., the input nodes or another hidden node), applying different weighting factors to each input. The hidden nodes then apply an activation function in much the same way as the input nodes. The output is then passed on to additional nodes, which process it as input. This process continues until the original input has propagated through the artificial neural network and reaches one or more output nodes.

An output node applies an activation function in the same manner as other nodes, but rather than passing its output to another node, it outputs a result. For example, neural networks might be designed to determine whether an input image includes any people or animals. The network might have two output nodes, one for people and one for animals. If the input image is determined to contain a person or an animal, the corresponding output node is activated. If it is determined to contain a person and an animal, both output nodes would activate.

A common approach in building neural networks is to train them using a training data set before using them to solve real problems. In the training phase, input data for which the correct answer is already known is provided to the neural network, and the resulting output is used to train the network by adjusting the input weightings for one or more nodes. For example, a common class of optimization algorithms use gradient descent methods with backpropagation to minimize the error cost of the network.

Many trained neural networks employ tens or hundreds of millions of parameters to achieve good performance. Storing neural networks that employ a large number of parameters takes significant amount of storage space. Neural networks may be used on devices with limited storage space, for example, mobile devices. For these devices, storing such large neural networks takes away storage space from other applications that may be installed or used on the devices. Furthermore, these neural networks may have to be transmitted via computer networks from one system to another. For example, the neural network may be trained by a server and transmitted to client devices that use the neural network. Transmitting such large neural networks via computer networks from one system to another can be a slow and inefficient process. Furthermore, the training process itself is slow because a very large number of parameters are processed. Conventional techniques of processing neural networks that store or transmit these neural networks have these deficiencies.

SUMMARY

A system generates neural network based models having a compressed representation. The system receives a request for training a neural network. The system determines one or more seeds for random number generation. The system initializes a first parameter vector representing weights of the neural network. The elements of the first parameter vector are determined using random numbers generated based on the one or more seeds. The first parameter vector is in a native parameter space having a particular number of dimensions.

The system determines a subspace having fewer dimensions than the dimensions of the native parameter space. The system determines a projection matrix for mapping the first parameter vector to a second parameter vector in the subspace. The second parameter vector is typically significantly smaller than the first parameter vector. The system determines elements of the projection matrix by generating random numbers based on the one or more seeds. The system trains the neural network by modifying the parameter vectors in the dimensions of the subspace. The training generates a trained parameter vector in the subspace.

The system stores a compressed representation of the neural network comprising the seeds and the trained parameter vector in the subspace. The system may transmit the compressed representation of the neural network to a target system. The compressed representation of the neural network take less storage than a trained parameter vector in the native parameter space. The compressed representation of the neural network is also efficient for purposes of transmitting to any target system.

Although the techniques are described using neural networks, the techniques are applicable to other types of parameter based models, for other example machine learning based models. Furthermore, the techniques can be used for various types of models, for example, supervised learning based models, reinforcement learning based models, and so on. The machine learning based models, for example, neural networks may be used for various applications, for example, generating maps, recognition of objects in images, processing sensor data captured by a robot or a vehicle, playing of video games, natural language processing, and so on.

The features and advantages described in this summary and the following detailed description are not all-inclusive. Many additional features and advantages will be apparent to one of ordinary skill in the art in view of the drawings, specification, and claims hereof.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Neural networks are a powerful tool in a wide range of technological fields, from medical diagnosis to spam filtering, and self-driving cars to ocean modelling. However, neural networks regularly have between tens of thousands and hundreds of millions of dimensions (e.g., weighting factors). In real world applications, this can cause problems with respect to both memory and processing power requirements. In cases where the neural network is provided to end users over a data network (e.g., if it is used in a mobile app), the bandwidth consumed by transmitting the neural network can also become a significant limiting factor. For example, a server may periodically train the network based on new training data received and transfer the updated parameters of the neural network to all client devices. Since there can be a large number of client devices that use the neural network, a large amount of communication bandwidth as well as computing resources may be utilized for transmitting the neural network from the server to each computing device. Furthermore, since the same neural network is stored in a large number of client devices, the aggregate storage used for storing all the copied of the neural network can be significant. Embodiments of the invention generate compressed representations of neural network that can be stored efficiently as well as transmitted efficiently via computer networks.

Overview

Embodiments of the invention train neural networks using fewer parameters than specified and obtain a compressed representation of the neural network that retains a high degree of accuracy. A system achieves the compression by randomly selecting a subspace of the parameters to use and training the neural network in that reduced subspace. In many cases, a significant degree of compression can be achieved with only a minimal decrease (if any) in accuracy. For example, in one embodiment, a neural network with 800,000 parameters can be reduced to just 800 parameters while maintaining 90% accuracy. In environments where storage space and/or bandwidth are limited, this can significantly increase the practicability of using neural networks to perform tasks.

Accordingly, embodiments of the invention allow compression of the neural networks, thereby reducing the number of bits used to represent the parameters of the neural network. Depending on the training data set and the architecture of the neural network, the compression may reduce the size of the neural network to a fraction of a percent of the uncompressed neural network. As a result, embodiments improve the efficiency of storage and network bandwidth by a huge amount. Systems that use the compressed neural networks generated by embodiments of the invention are able to transmit the neural network significantly more efficiently than an uncompressed neural network. Furthermore, systems that use the compressed neural networks generated using embodiments of the invention are able to store the neural networks using significantly smaller storage space compared to an uncompressed neural network.

Example Systems

Figure 1:
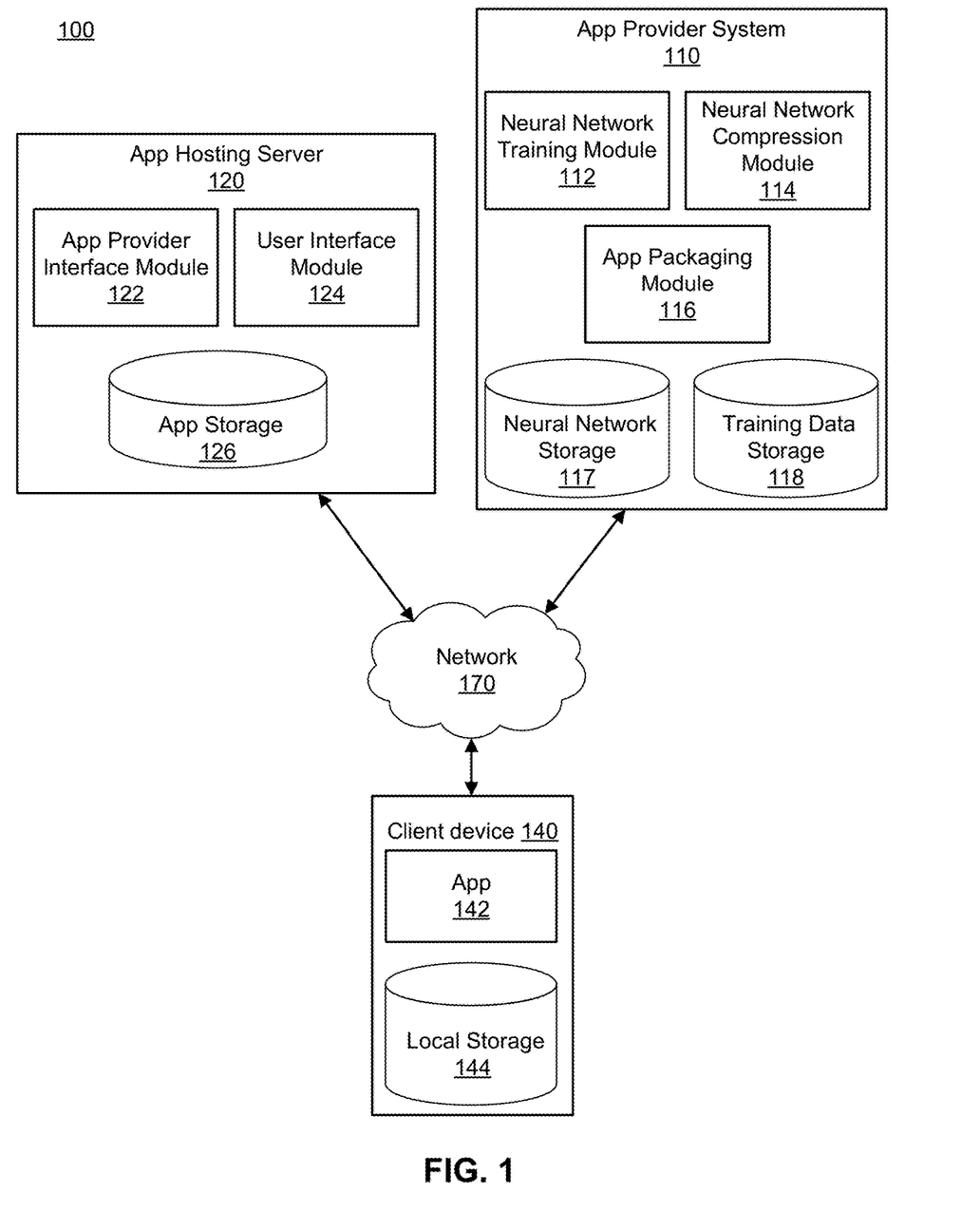
FIG. 1 is a high-level block diagram illustrating a networked computing environment in which compressed neural networks may be used, according to one embodiment.

FIG. 1 illustrates one embodiment of a networked computing environment 100 in which compressed neural network may be used. In the embodiment shown in FIG. 1, the networked computing environment 100 includes an app provider system 110, an app provider server 120, and a client device 140, all connected via a network 170. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the app 142 directly from the app provider system 110, rather than from the app hosting server 120.

The app provider system 110 is one or more computer systems with which the provider of software (e.g., an app designed to run on a cell phone or tablet) develops that software. Although the app provider system 110 is shown as a single entity, connected to the network 170, for convenience, in many cases it will be made up from several software developer's systems (e.g., terminals) which may or may not all be network-connected.

In the embodiment shown in FIG. 1, the app provider system 110 includes a neural network training module 112, a neural network compression module 114, an app packaging module 116, neural network storage 117, and training data storage 118. In other embodiments, the app provider system 110 contains different and/or additional elements. In addition, the functions may be distributed among the elements in a different manner than described.

The neural network training module 112 is used to train neural networks. In one embodiment, the neural network training module 112 takes a set of training inputs that have known outputs (e.g., stored in the training data storage 118) and divides it into a training set and a validation set. The neural network is then trained using the training set (e.g., using a backpropagation algorithm) and then tested against the validation set to determine its accuracy after training. This process can be repeated using variations in the structure of the neural network and the results of validation compared to identify a neural network that is likely to reliably make the intended determination when presented with input data for which the correct output is already known.

For example, a neural network might be intended to identify faces in photographs. The training and validation sets would contain a variety of faces and instances of images including no face at all. The network is trained by adjusting parameters (e.g., node weightings) to minimize a loss function (i.e., a measure of the number and/or degree of errors) that results from applying the network to the training set. Once the network has been trained, it is applied to the validation set and the degree to which it successfully identifies faces is recorded. If the network makes few or no errors when applied to the validation set, this is a strong indicator that the network will correctly identify faces in photographs that have not already been classified.

The neural network compression module 114 takes a neural network (e.g., as produced by the neural network training module 112 and stored in neural network storage 117) with D dimensions (parameters) and compresses it. The neural network compression module 114 performs compression of neural networks using various processes described herein. The neural network compression module 114 stores the compressed neural network in neural network storage 117. The app provider system 110 may transmit the compressed neural network to external systems, for example, a client device 140. The compression of the neural network results in communication and computational efficiency during transmission and storage.

In one embodiment, the neural network compression module 114 applies a mapping function that reduces the D-dimensional, full neural network to a d-dimensional, lower-order representation, where d<D. The mapping function can be a subspace projection that is either linear or non-linear (e.g., using polar coordinates). Regardless of how it is generated, the neural network compression module 114 applies the lower-order representation to the validation data set to determine the accuracy of the representation. For example, if the full neural network correctly classifies all of the items in a one hundred item validation set and the lower-order representation correctly classifies ninety of them, the representation can be considered to be 90% accurate.

In one embodiment, the neural network compression module 114 randomly selects a starting position in the full neural network space and randomly generates a d×D projection matrix. These choices are then frozen, meaning the resulting system has d degrees of freedom (i.e., it is a lower-order representation of the network). Because the starting position and projection matrix were frozen, merely storing the random seed used is sufficient for the lower-order representation to be reproduced later (e.g., at a client device 140). Thus, only the random seed and the value of the d parameters used need to be included in an app that uses the compressed neural network.

The app packaging module 116 takes a lower-order representation of a neural network and packages it into an app to be provided to client devices 140. For example, the app packaging module 116 might be used to create an app for booking and managing trips with a ride-sharing service. In one embodiment, the app might include a neural network configured to take various data available at the client device 140 and predict whether the device is currently inside a vehicle providing a ride. The full neural network may be too large to provide to client devices 140 over the network 170, so the app instead includes a lower-order representation that is sufficiently accurate to provide a good user experience.

Once packaged, the app is made available to client devices 140 (e.g., via the app hosting server 120).

The neural network storage 117 and training data storage 118 include one or more computer-readable storage-media that are configured to store neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 122 provides an interface with which app providers (e.g., the operator of app provider system 110) can add apps to a marketplace or other on-line store to make them available to users (either free or for payment of value). In one embodiment, an app provider fills out an on-line form with basic information about the app (e.g., name, app provider name, version number, a short description of what it does, and the like) and uploads the app in an appropriate format. The app provider interface module 114 adds the app (along with metadata with some or all of the information provided about the app) to app storage 126. In some cases, the app provider information module 114 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a marketplace in which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In the embodiment shown in FIG. 1, the client device 140 includes an app 142 and local storage 144. The app 142 is one that uses a neural network to perform a task, such as one created by the app provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

The system environment 100 shows one example where the disclosed techniques for compressing and uncompressing neural networks are used. The disclosed techniques for compressing and uncompressing neural networks may be used in apparatus or devices used for other applications, for example, a self-driving car, a robot, or an image processing system that recognizes objects and takes actions based on recognition of images. The neural network may be used to guide a robot through obstacles or features that are detected by a system. The system may use sensors to sense the state of the surroundings and may perform certain actions. For example, the sensor may be a camera that captures images of the surroundings. Other examples of sensors include a LIDAR, an infrared sensor, a motion sensor, a pressure sensor, or any other type of sensor that can provide information describing the environment to the system. The system may send signals to a control system for taking certain actions based on the result obtained by execution of the neural networks. An example of an action is sending an alert to user informing the user of certain condition within the environment, for example, detection of an anomaly in signals. Another example of an action is sending signals to controls of a robot or a vehicle causing the robot or vehicle to move based on the result of execution of the neural network.

Intrinsic Dimensions of a Neural Network

Neural Network optimization, also referred to as the direct method of training, entails evaluating the gradient of a loss with respect to $\theta^{(D)}$ and taking steps directly in the space of $\theta^{(D)}$. A system 110 may train the model in a random subspace, defined as follows by equation (1):

$$\theta^{(D)} = \theta_0^{(D)} + P*\theta^{(d)} \quad (1)$$

Where P is a randomly generated D×d projection matrix and $\theta^{(d)}$ is a parameter vector in a generally smaller subspace $\mathbb{R}^d$, where $\mathbb{R}$ is the set of rational numbers and d is a value smaller than D. The system 110 generates $\theta_0^{(D)}$ and P randomly and these values are not trained, so the system has only d degrees of freedom. Given the seed used for generating $\theta_0^{(D)}$ and P, a system can regenerate these values by following the same process that was initially used to generate them. In an embodiment, the system initializes $\theta^{(d)}$ to a vector of all zeros, so initially $\theta^{(D)} = \theta_0^{(D)}$. This setting serves following purposes. First, it puts the subspace used for training and the solution set in general position with respect to each other. This setting avoids cases where both the solution set and the random subspace contain structure oriented around the origin, which could lead to non-intersection even for high dimensional solution sets and random subspaces. Second, in the case of neural network training, this setting allows the neural network to benefit from beginning in a region of parameter space supposed by any number of initialization schemes to be well-conditioned such that gradient descent via commonly used optimizers tends to produce a parameter vector $\theta^{*(D)}$ for a trained neural network with low loss.

The system performs training by computing gradients with respect to $\theta^{(d)}$ and taking steps in that subspace. The system normalizes columns of P to unit length (or some predetermined length), so steps of unit length in $\theta^{(d)}$ chart out unit length motions of $\theta^{(D)}$. In some embodiment, the system orthogonalizes columns of P. In other embodiments, the system simply uses random vectors since high dimensional random vectors are approximately orthogonal. By this construction P forms an approximately orthonormal basis for a randomly oriented d dimensional subspace of $\mathbb{R}^D$, with the origin of the new coordinate system at $\theta_0^{(D)}$.

Figure 2A:
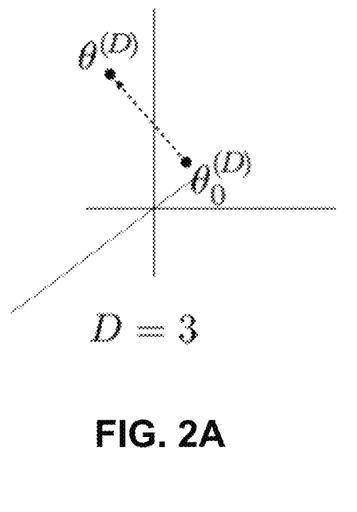
FIG. 2A-B illustrates mapping a higher dimensional parameter vector space to a lower dimensional parameter vector space, according to one embodiment.
Figure 2B:
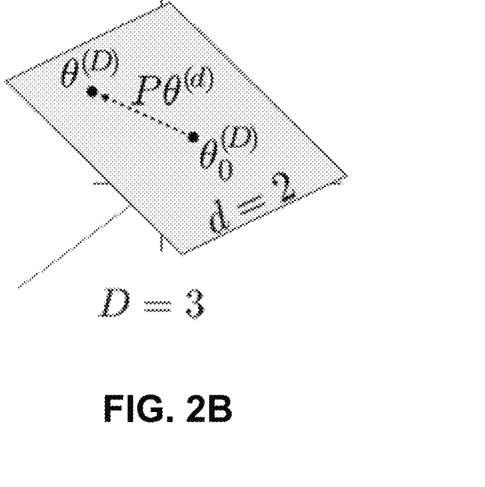

FIGS. 2A and 2B illustrate mapping a higher dimensional parameter vector space to a lower dimensional parameter vector space, according to one embodiment. FIG. 2A illustrates performing direct optimization in the D=3 case. The training modifies parameter vectors $\theta_0^{(D)}$ to parameter vectors $\theta^{(D)}$ in the D=3 dimensional space. FIG. 2B illustrates performing optimization in a possible random subspace for the D=3, d=2 case. The training of the neural network modifies parameter vectors $\theta_0^{(D)}$ in the d=2 dimensional subspace to obtain parameter vectors $\theta^{(D)}$.

Figure 2C:
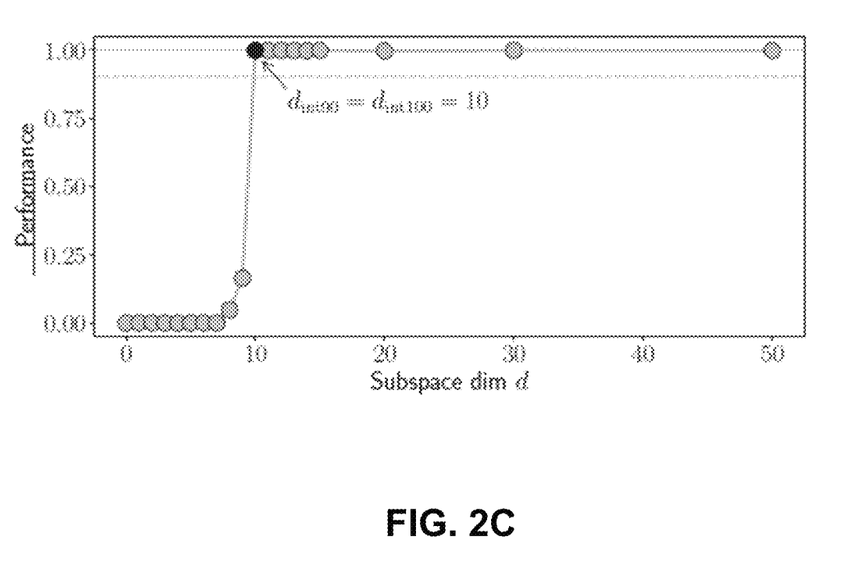
FIG. 2C illustrates a relation between performance of a neural network and subspace dimension, according to one embodiment.

FIG. 2C illustrates a relation between performance of a neural network and subspace dimension, according to one embodiment. As the system increases the number of dimensions d of the subspace, the performance of the model improves. As illustrated in FIG. 2C, the performance is 90% of the ideal performance at subspace dimension d=10. The ideal performance is assumed to be the performance when training a model in D dimension, for example, D=100.

If the system sets d=D and makes P an identity matrix, the system is solving exactly the direct optimization problem. If the system sets d=D but P is instead a random orthonormal basis for all of $\mathbb{R}^d$, the system performs a rotated version of the direct problem. For some rotation-invariant optimizers, such as stochastic gradient descent (SGD) and SGD with momentum, rotating the basis does not change the solution found. However, for optimizers with axis-aligned assumptions, such as RMSProp or ADAM, the path taken through $\theta^{(D)}$ space by an optimizer may depend on the rotation chosen.

Processes

Figure 3:
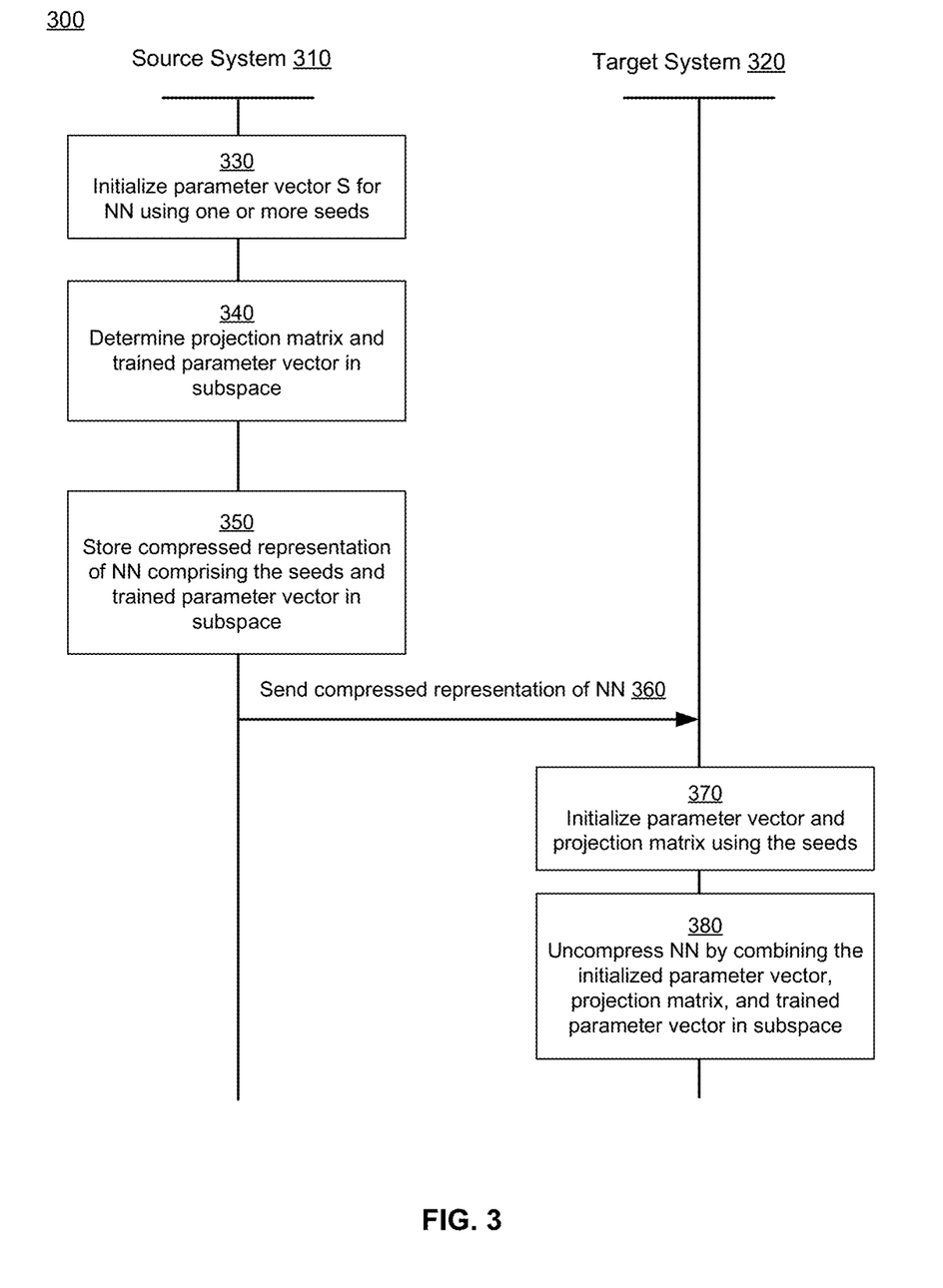
FIG. 3 is an interaction diagram illustrating the process of generating a compressed representation of a neural network and uncompression of the neural network, according to one embodiment.

FIG. 3 is an interaction diagram illustrating the process 300 of generating a compressed representation of a neural network and uncompressing the neural network, according to one embodiment. The source system 310 initializes 330 a parameter vector for the neural network using a seed selected from one or more seeds. For example, the source system 310 may generate a sequence of random values based on the selected seed and use them as parameters. The source system 310 initializes 330 a projection matrix P based on a seed selected from the one or more seeds. The source system 310 generates a trained parameter vector $\theta^{(d)}$ in a subspace d with fewer dimensions compared to space D. The source system 510 stores 350 a compressed representation of the neural network comprising the seeds and the trained parameter vector $\theta^{(d)}$. The source system 310 sends 360 the compressed representation of the neural network to a target system 320.

The target system 320 receives the compressed representation of the neural network. The target system 320 extracts the seeds from the compressed representation of the neural network and initializes 370 the parameter vector using the seeds. The target system 320 further initializes the projection matrix P using a seed from the seeds as indicated by the compressed representation of the neural network. The target system 320 extracts the trained parameter vector $\theta^{(d)}$ in subspace d from the compressed representation of the neural network received. The target system 320 uncompresses the neural network by combining the initialized parameter vector, projection matrix, and trained parameter vector in subspace, for example, based on equation (1).

Figure 4:
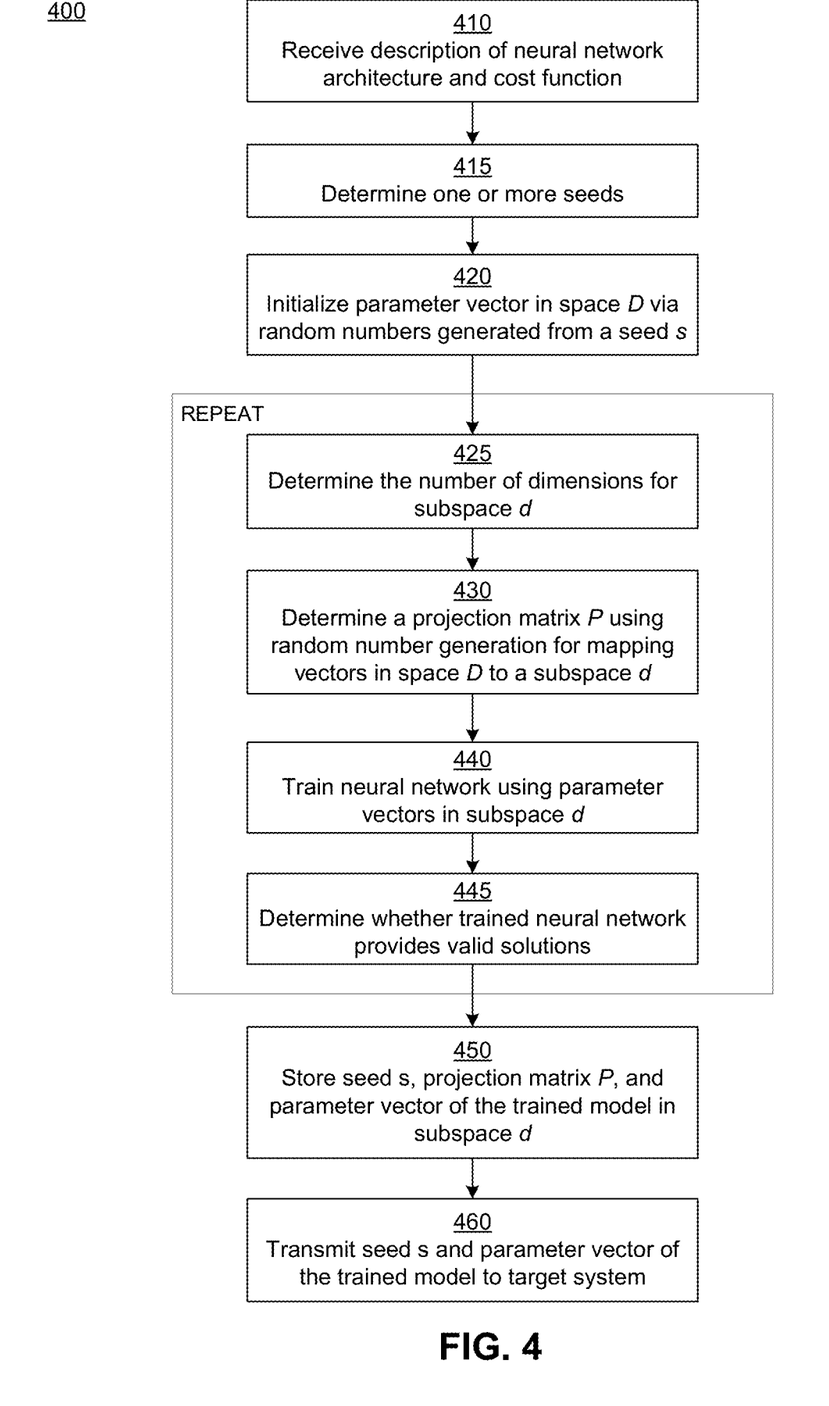
FIG. 4 illustrates a process for generating a compressed representation of a neural network, according to one embodiment

FIG. 4 illustrates a process for generating a compressed representation of a neural network, according to one embodiment. The neural network compression module 114 receives 410 a description of neural network architecture and cost function for neural network with set S of N parameters. For example, the description may specify whether the neural network is a convolutional neural network, recurrent neural network, multi-layer perceptron, and so on. The description may further specify the depth of the neural network and description of various stages of the neural network including the number of parameters used in each stage of the neural network. The neural network compression module 114 may determine the total number of parameters N as specified, based on the description.

The neural network compression module 114 determines 415 one or more seed values. The neural network compression module 114 may generate the seeds randomly. The neural network compression module 114 initializes 420 a parameter vector $\theta^{(D)}$ in space D via random numbers generated from a seed s.

The neural network compression module 114 repeats the steps 425, 430, 440, and 445 for one or more iterations. The neural network compression module 114 determines 425 the number of dimensions of the subspace d. The neural network compression module 114 may initialize the number of dimensions of subspace d to a fraction of the number of dimensions of space D. Alternatively, the neural network compression module 114 may initialize the number of dimensions of subspace d to a small predetermined value, for example, 100 or 1000. The neural network compression module 114 modifies the value of the number of dimensions of subspace d during the process 400.

The neural network compression module 114 may determine 425 the number of dimensions of the subspace d based on previous iterations of the process. For example, if the neural network compression module 114 determines in a particular iteration of the process of training the neural network that a value n of the number of dimensions did not result in neural networks that provided valid solutions, the neural network compression module 114 may determine that the value of the number of dimensions of subspace d must be greater than n. Alternatively, if the neural network compression module 114 determines in a particular iteration of the process of training the neural network that a value n of the number of dimensions resulted in neural networks that provided valid solutions, the neural network compression module 114 may determine a value of the number of dimensions of subspace d to be smaller than n so as to generate neural networks in smaller subspace.

The neural network compression module 114 further determines 430 a projection matrix P for mapping vectors in space D to a subspace d. The neural network compression module 114 generates elements of the projection matrix P via random number generation that may be based on the seed s or another seed value. In some embodiments, the neural network compression module 114 performs additional processing of the matrix obtained via random number generation, for example, orthogonalization and/or normalization of the projection matrix. The neural network compression module 114 trains 440 the neural network using parameter vectors in subspace d.

In an embodiment, the neural network compression module 114 repeats the steps 425, 430, 440, and 445 until it obtains a trained model that provides solutions. The neural network compression module 114 stores 450 a compressed representation of the neural network comprising the seed values used for generating the initial parameter vector and the parameters of the trained neural network in the lower dimensional subspace. The amount of storage used for storing the compressed representation of the neural network is significantly less than the storage used for storing a neural network with parameters in the original space D. The neural network compression module 114 does not need to store or transmit the projection matrix since the projection matrix can be regenerated from the seed values.

In an embodiment, the compressed representation of the neural network comprises instructions used for generating the initial parameter vector and the projection matrix, for example, the random number generation technique used for generating elements of the initial parameter vector and the projection matrix. Furthermore, if the neural network compression module 114 obtained the projection matrix by performing additional processing, for example, orthogonalization and or normalization of the projection matrix, the neural network compression module 114 stores the instructions or description of the processing performed to obtain the projection matrix as part of the compressed representation of the neural network. The neural network compression module 114 transmits 460 a compressed representation of the neural network comprising the seeds used to generate the parameter vectors and the trained parameter vector to a target system, for example, a client device. The transmission of the compressed representation of the neural network is significantly more efficient in terms of communication and computational resources compared to the transmission of an uncompressed neural network with parameters in the original space D.

Figure 5:
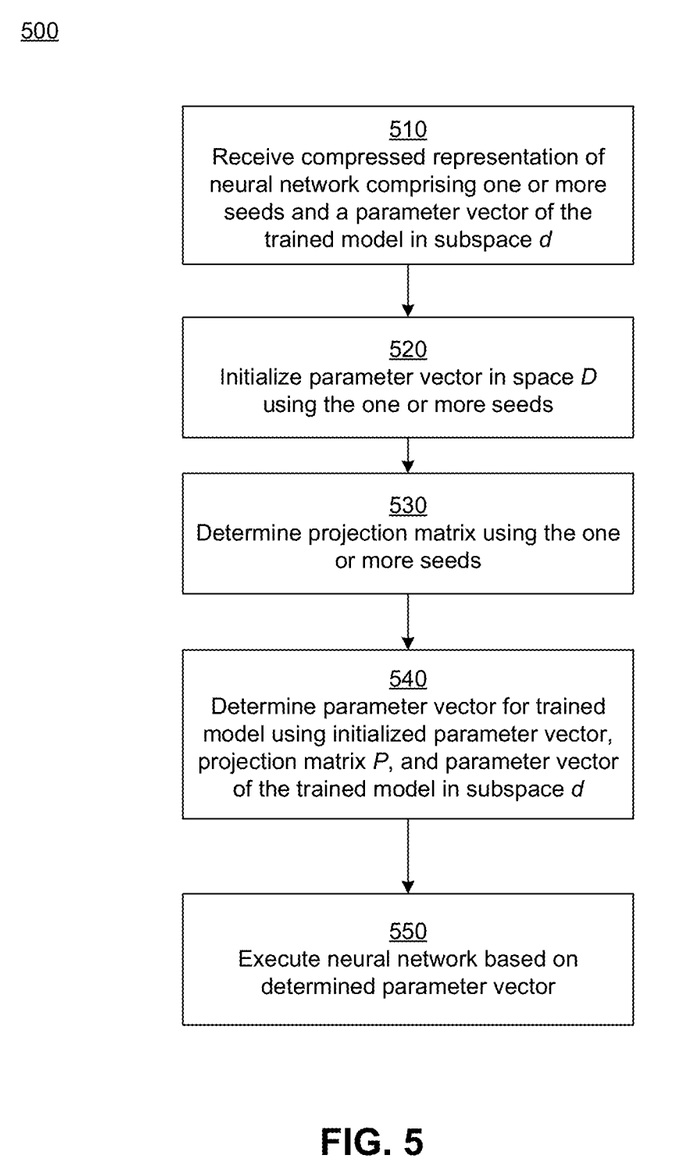
FIG. 5 illustrates a process for uncompression and execution of a compressed representation of a neural network, according to one embodiment.

FIG. 5 illustrates a process 500 for uncompression and execution of a compressed representation of a neural network, according to one embodiment. The process 500 may be executed by a target system that receives a compressed representation of the neural network from the source system. Alternatively, the process 500 may be executed by the source system that generated the compressed representation of the neural network, for example, at a later stage after the generation of the compressed representation of the neural network. The steps disclosed herein are described as being performed by a system that may represent a source system or the target system.

The system receives 510 the compressed representation of the neural network comprising one or more seeds and a parameter vector of the trained model in subspace d. The system initializes 520 a parameter vector in space D using a seed selected from the one or more seeds stored in the compressed representation of the neural network. The system determines 530 a projection matrix P using a seed selected from the one or more seeds stored in the compressed representation of the neural network. The seed used for generating the projection matrix P may be same as the seed used for generating the initial parameter vector in space D or it may be a different seed. The system determines 540 a parameter vector in space D representing the trained model using initialized parameter vector, projection matrix P, and parameter vector of the trained model in subspace d, for example, using the processing as specified in equation (1). The system executes 550 the neural network based on the determined parameter vector.

The neural network compression module 114 can generate different d-dimensional representations of the full neural network, gradually increasing d, until the accuracy of the resulting lower-order representation exceeds a threshold (e.g., 90%). The threshold can be set differently depending on the relative importance of accuracy and size of the compressed neural network. For example, if accuracy of results is important (e.g., in a network designed to make automated decisions for a self-driving car regarding which way to turn), the threshold might be increased, resulting in greater accuracy but less compression. Conversely, if the decision is relatively unimportant (e.g., deciding when to show an advertisement on screen), the threshold might be decreased, resulting in lower accuracy but a greater amount of compression.

In another embodiment, the neural network compression module 114 uses a random seed to select a first dimension to potentially include in the compressed neural network. It then explores this dimension (e.g., using a random walk or training via gradient descent) to determine whether it has a significant impact on the outcome when the network is applied (e.g., is it relatively flat or are there significant peaks and troughs in that dimension?). If the dimension is determined to be significant, it is included in the compressed neural network, otherwise it is not. A second potential dimension to include is then identified (based on the same random seed as a starting point) and the same process used to determine whether it should be included. Which dimensions are included and which are not can be stored and included in the compressed neural network as a series of single bits (e.g., with a 1 indicating the corresponding dimension should be included and a zero indicating that it should not). This continues until the size of the compressed neural network reaches a pre-determined size (either including or not including the bitmap indicating which dimensions to include) or pre-determined level of performance. Because all of the dimensions considered are generated based on the same random seed, the bitmap can be used to reproduce the same set of dimensions (e.g., at a client device 140) as long as the same random seed is available.

Figure 6:
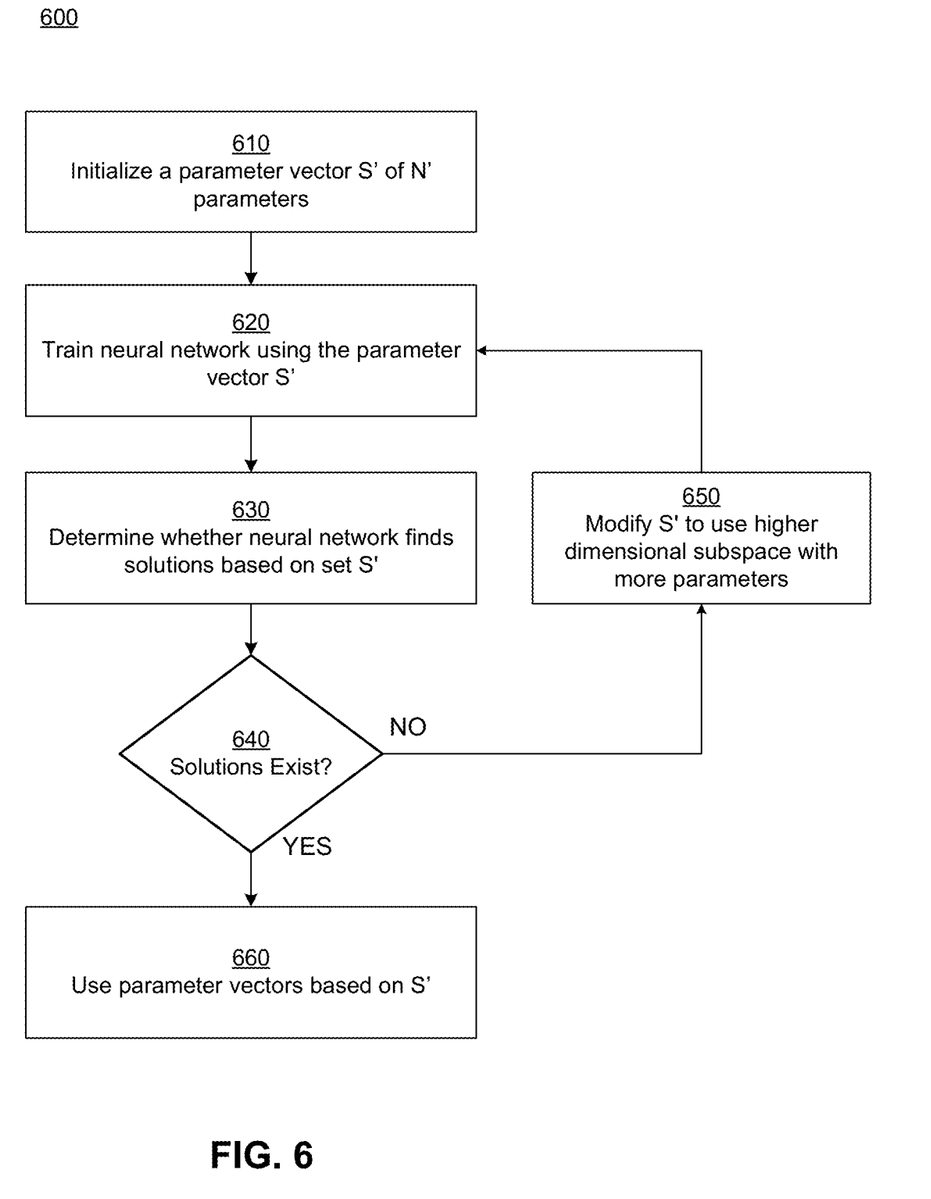
FIG. 6 illustrates a process for determining a lower dimensional subspace for a neural network, according to one embodiment.

FIG. 6 illustrates a process 600 for determining the lower dimensional subspace d for a neural network, according to one embodiment. The neural network compression module 114 starts with a subspace with small number of dimensions and increases the number of dimensions of the subspace in each iteration until the trained models provides solutions.

The variable N represents the number of dimensions of the original space D specified for the neural network. The neural network compression module 114 initializes 610 a parameter vector S' in a subspace of N dimensions where N' is smaller than N. The neural network compression module 114 trains 620 the neural network using the parameter vector S'. The neural network compression module 114 determines 630 whether the trained neural network based on parameter vector S' provides solutions. The neural network compression module 114 may determine that a trained neural network provides solutions by executing the trained neural network model. For example, if the neural network model is based on supervised learning and uses a labeled training data set, in some cases performance may be quantified through the metric of accuracy. In these cases, the neural network compression module 114 may determine that the trained neural network model provides solutions by executing the trained neural network model for input values with known results. If the trained neural network model predicts results that have more than a threshold percentage of accuracy based on comparison of predicted results with known results, the neural network compression module 114 determines that the trained neural network model provides solutions. If the trained neural network model outputs results that have less than the threshold percentage of accuracy based on the comparison of predicted results with known results, the neural network compression module 114 determines that the trained neural network model does not provide solutions.

The compressed representation of neural networks may be used for various applications such as generating maps, object recognition in images, processing of sensor data, natural language processing, and others.

In some embodiments, the neural network is based on reinforcement based learning that monitors a state of the environment using sensors or user input and uses the state of the environment to determine a quality of results. For example, the neural network may be used by an apparatus or device, for example, a self-driving car or a robot. The apparatus of device may be in an environment representing the surroundings of the system, for example, a geographical region through which a self-driving car is travelling or a maze or an obstacle course through which a robot is walking. As another example, the environment may represent a setup of a game that the system is playing, for example, an ATARI game and the system monitors progress of the game using a sensor that monitors the display of the game. In these embodiments, the neural network compression module 114 determines that the neural network provides solutions if the system executing the neural network is able to perform the expected task with greater than a threshold accuracy. For example, the neural network compression module 114 determines that the neural network provides solutions if a robot using the neural network is able to avoid obstacles in an obstacle course with greater than a threshold accuracy or a system playing a game is able to successfully play the game for more than a threshold number of runs or is able to obtain over a threshold score.

If the neural network compression module 114 determines 640 that the neural network does not provide solutions, the neural network compression module 114 modifies 650 S' to use higher dimensional subspace with more parameters. Accordingly, the neural network compression module 114 increases the number of dimensions of the subspace to generate larger parameter vectors. The neural network compression module 114 repeats the steps 620, 630, and 640 with the modified subspace. If the neural network compression module 114 determines 640 that the neural network provides solutions, the neural network compression module 114 uses 660 a parameter vectors based on S', for example, as the result of the process 400.

In other embodiments, the neural network compression module 114 performs other techniques for searching for a subspace that results in neural networks that provide solutions, for example, a binary search. For example, the neural network compression module 114 starts with a small subspace of $n_1$ dimensions that does not provide solutions. The neural network compression module 114 increases the number of dimensions to $n_2$ by taking a large step that increases the number of dimensions of the subspace by a large amount that is greater than a predetermined threshold value. If the trained neural network model in subspace of $n_2$ dimensions does not provide solutions, the neural network compression module 114 continues to increase the number of dimensions of the subspace by larger and larger steps until it reaches a subspace size that results in neural network models that provide solutions. If the neural network compression module 114 finds a subspace with $n_x$ dimensions that provide solutions, the neural network compression module 114 identifies the subspace with the largest number $n_y$ of dimensions that did not provide solutions and looks for a value $n_z$ in between $n_x$ and $n_y$ that provides solutions. The neural network compression module 114 may repeat the process of searching for a smaller value $n_z$ that provides solutions until it reaches a fixed number of iterations or exceeds a fixed amount of processing time.

Although the techniques disclosed herein are described in connection with neural networks, the disclosed techniques can be used for any type of machine learning based model. Accordingly, the systems and processes described herein can generate compressed representations of machine learning based models. In general, the disclosed techniques can be used for any type of parameter based model that receives a plurality of values as input and generates one or more scores. Accordingly, the systems and processes described herein can generate compressed representations of any type of parameter based models.

Computing System Architecture

Figure 7:
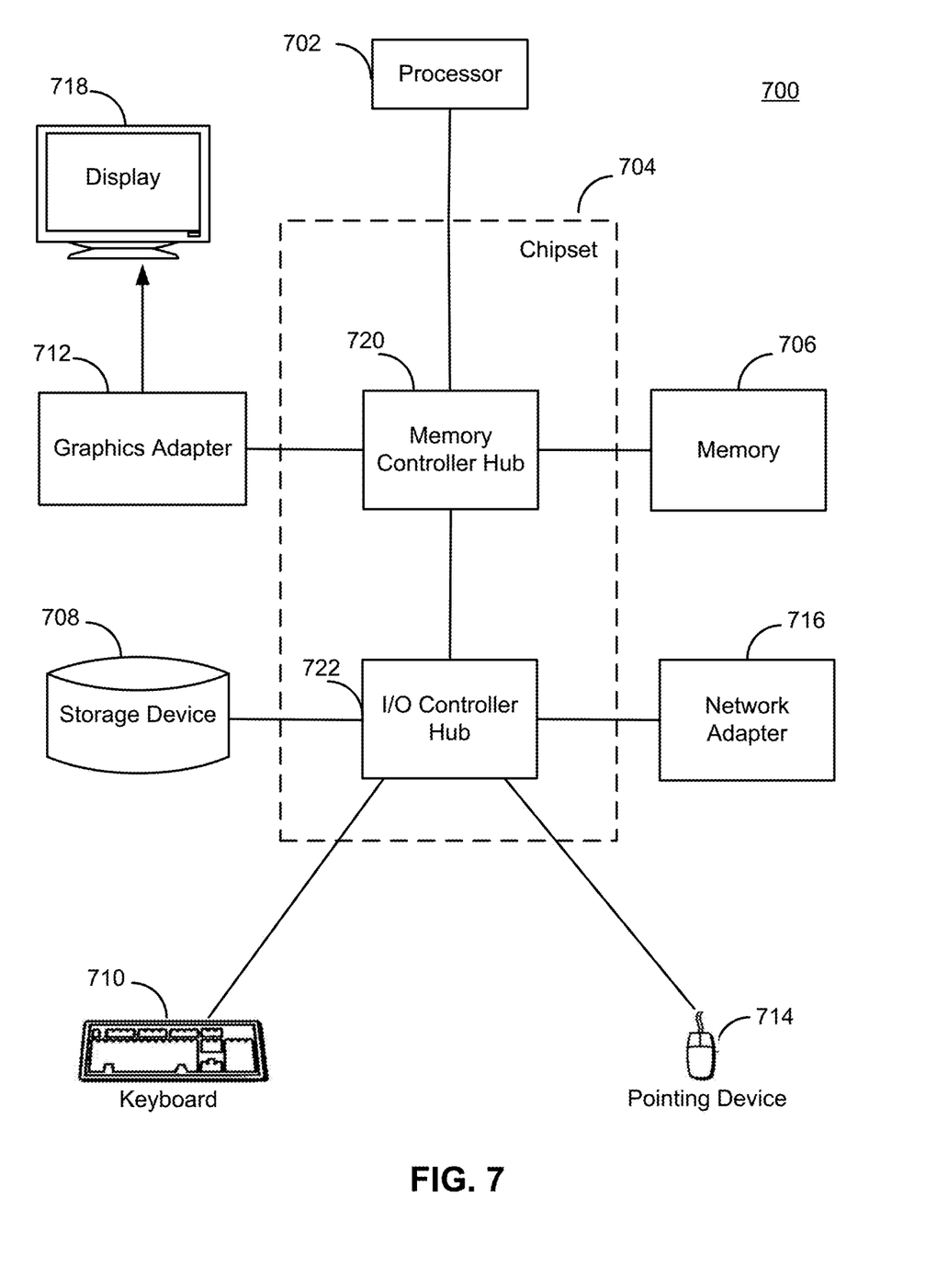
FIG. 7 is a high-level block diagram illustrating an example of a computer suitable for use in the computing environment of FIG. 1, according to one embodiment.

FIG. 7 is a high-level block diagram illustrating an example computer 700 suitable for use as a client device 140, app hosting server 120, or app provider system 110. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks (e.g., network 170).

The types of computers used by the entities of FIG. 1 can vary depending upon the embodiment and the processing power required by the entity. For example, the app hosting server 120 might include a distributed database system comprising multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer implemented method for generating compressed neural networks, the method comprising:
    receiving a request for training a neural network;
    determining one or more seeds;
    initializing a first parameter vector representing weights of the neural network, the initialization comprising determining values of the first parameter vector using random numbers generated based on the one or more seeds, the first parameter vector comprising a particular number of dimensions in a native parameter space;

determining a number of dimensions for a smaller dimensional space corresponding to the native space for training the neural network, the number of dimensions of the smaller dimensional space being less than the particular number of dimensions of the first parameter vector in the native parameter space;

determining a matrix, the size of the matrix based on the particular number of dimensions of the native parameter space and the number of dimensions of the smaller dimensional space, the determining of the matrix comprising determining elements of the matrix by generating random numbers based on the one or more seeds;

training the neural network by modifying parameter vectors in the smaller dimensional space, the smaller dimensional space representing a random subspace of the native parameter space determined by the matrix and the first parameter vector, the training generating a trained parameter vector in the smaller dimensional space which represents a trained native parameter vector in the random subspace;

storing a compressed representation of the neural network comprising one or more seeds and the trained parameter vector in the smaller dimensional space;

transmitting the compressed representation of the neural network to a target system; and uncompressing by the target system, the neural network by determining the trained native parameter vector using the one or more seeds and the trained parameter vector in the smaller dimensional space.

2. The computer implemented method of claim 1, wherein the training comprises:
   determining a gradient based on a current value of a parameter vector in the smaller dimensional space; and
   modifying the current parameter value of the parameter vector in the smaller dimensional space based on the gradient.

3. The computer implemented method of claim 1, wherein determining a matrix comprises:
   determining a first number of dimensions of the smaller dimensional space;
   determining a first matrix based on the first number of dimensions of the smaller dimensional space;
   determining that a first neural network model based on parameter vectors obtained from the first matrix fails to generate solutions;
   determining a second number of dimensions of the smaller dimensional space wherein the second number of dimensions is greater than the first number of dimensions;
   determining a second matrix based on the second number of dimensions of the smaller dimensional space; and
   determining whether a second neural network model based on parameter vectors obtained from the second matrix generates solutions.

4. The computer implemented method of claim 3, wherein determining a matrix comprises:
   determining that the second neural network model based on parameter vectors obtained from the second matrix generates solutions;
   determining a third number of dimensions of the smaller dimensional space wherein the third number of dimensions is less than the second number of dimensions;
   determining a third matrix based on the third number of dimensions of the smaller dimensional space; and
   determining whether a third neural network model based on parameter vectors obtained from the third matrix generates solutions.

5. The computer implemented method of claim 1, further comprising:
   transforming the matrix such that columns of transformed matrix are orthogonal and normalized to some predetermined length.

6. The computer implemented method of claim 1, wherein the neural network is configured to receive an image as input and generate a score based on the image.

7. The computer implemented method of claim 1, wherein the neural network is configured to receive sensor data captured by sensors of a vehicle, wherein a result of the neural network is used for navigating the vehicle.

8. A computer implemented method for generating neural network models, the method comprising:
   receiving a request for training a neural network model;
   determining one or more seeds;
   initializing a first parameter vector representing weights of the neural network model, the initialization comprising determining values of the first parameter vector using random numbers generated based on the one or more seeds, the first parameter vector in a native parameter space;
   determining a number of dimensions for a smaller dimensional space corresponding to the native space, the number of dimensions of the smaller dimensional space being less than the number of dimensions of the native parameter space;
   determining a matrix, the size of the matrix based on the particular number of dimensions of the native parameter space and the number of dimensions of the smaller dimensional space, the determining of the matrix comprising determining elements of the matrix by generating random numbers based on the one or more seeds;
   training the neural network model by modifying parameter vectors in the smaller dimensional space, the smaller dimensional space representing a random subspace of the native parameter space by the matrix and the first parameter vector, the training generating a trained parameter vector in the smaller dimensional space which represents a trained native parameter vector in the random subspace;
   storing a compressed representation of the neural network comprising one or more seeds and the trained parameter vector in the smaller dimensional space; and
   uncompressing the neural network model by determining the trained native parameter vector using the one or more seeds and the trained parameter vector in the smaller dimensional space.

9. The computer implemented method of claim 8, wherein the training comprises:
   determining a gradient based on a current value of a parameter vector in the smaller dimensional space; and
   modifying the current parameter value of the parameter vector in the smaller dimensional space based on the gradient.

10. The computer implemented method of claim 8, wherein determining a matrix comprises:
   determining a first number of dimensions of the smaller dimensional space;
   determining a first matrix based on the first number of dimensions of the smaller dimensional space;
   determining that a first neural network model based on parameter vectors obtained from the first matrix fails to generate solutions;

determining a second number of dimensions of the smaller dimensional space wherein the second number of dimensions is greater than the first number of dimensions;

determining a second matrix based on the second number of dimensions of the smaller dimensional space; and determining whether a second neural network model based on parameter vectors obtained from the second matrix generates solutions.

11. The computer implemented method of claim 10, wherein determining a matrix comprises:

determining that the second neural network model based on parameter vectors obtained from the second matrix generates solutions;

determining a third number of dimensions of the smaller dimensional space wherein the third number of dimensions is less than the second number of dimensions;

determining a third matrix based on the third number of dimensions of the smaller dimensional space; and determining whether a third neural network model based on parameter vectors obtained from the third matrix generates solutions.

12. The computer implemented method of claim 8, further comprising:

transforming the matrix such that columns of transformed matrix are orthogonal and normalized to some predetermined length.

13. The computer implemented method of claim 8, wherein the neural network model is configured to receive an image as input and generate a score based on the image.

14. The computer implemented method of claim 8, wherein the neural network model is configured to receive sensor data captured by sensors of a vehicle, wherein a result of the neural network model is used for navigating the vehicle.

15. A non-transitory computer readable storage medium storing instructions that when executed by one or more processors, cause the one or more processors to perform steps comprising:

receiving a request for training a neural network;

determining one or more seeds;

initializing a first parameter vector representing weights of the neural network, the initialization comprising determining values of the first parameter vector using random numbers generated based on the one or more seeds, the first parameter vector comprising a particular number of dimensions in a native parameter space;

determining a number of dimensions for a smaller dimensional space corresponding to the native space for training the neural network, the number of dimensions of the smaller dimensional space being less than the particular number of dimensions of the first parameter vector in the native parameter space;

determining a matrix, the size of the matrix based on the particular number of dimensions of the native parameter space and the number of dimensions of the smaller dimensional space, the determining of the matrix comprising determining elements of the matrix by generating random numbers based on the one or more seeds;

training the neural network by modifying parameter vectors in the smaller dimensional space, the smaller dimensional space representing a random subspace of the native parameter space determined by the matrix and the first parameter vector, the training generating a trained parameter vector in the smaller dimensional space which represents a trained native parameter vector in the random subspace;

storing a compressed representation of the neural network comprising one or more seeds and the trained parameter vector in the smaller dimensional space;

transmitting the compressed representation of the neural network to a target system; and uncompressing by the target system, the neural network by determining the trained native parameter vector using the one or more seeds and the trained parameter vector in the smaller dimensional space.

16. The non-transitory computer readable storage medium of claim 15, wherein the training comprises:

determining a gradient based on a current value of a parameter vector in the smaller dimensional space; and modifying the current parameter value of the parameter vector in the smaller dimensional space based on the gradient.

17. The non-transitory computer readable storage medium of claim 15, wherein instructions for determining the matrix comprise instructions for:

determining a first number of dimensions of the smaller dimensional space;

determining a first matrix based on the first number of dimensions of the smaller dimensional space;

determining that a first neural network model based on parameter vectors obtained from the first matrix fails to generate solutions;

determining a second number of dimensions of the smaller dimensional space wherein the second number of dimensions is greater than the first number of dimensions;

determining a second matrix based on the second number of dimensions of the smaller dimensional space; and determining whether a second neural network model based on parameter vectors obtained from the second matrix generates solutions.

18. The non-transitory computer readable storage medium of claim 17, wherein instructions for determining a matrix further comprise instructions for:

determining that the second neural network model based on parameter vectors obtained from the second matrix generates solutions;

determining a third number of dimensions of the smaller dimensional space wherein the third number of dimensions is less than the second number of dimensions;

determining a third matrix based on the third number of dimensions of the smaller dimensional space; and determining whether a third neural network model based on parameter vectors obtained from the third matrix generates solutions.

19. The non-transitory computer readable storage medium of claim 15, wherein the instructions further cause the one or more processors to perform the following step:

transforming the matrix such that columns of transformed matrix are orthogonal and normalized to some predetermined length.

20. The non-transitory computer readable storage medium of claim 15, wherein the neural network is configured to receive an image as input and generate a score based on the image.

21. The non-transitory computer readable storage medium of claim 15, wherein the neural network is configured to receive sensor data captured by sensors of a vehicle, wherein a result of the neural network is used for navigating the vehicle.

22. A non-transitory computer readable storage medium storing instructions that when executed by one or more processors, cause the one or more processors to perform steps comprising:
- receiving a request for training a neural network model;
- determining one or more seeds;
- initializing a first parameter vector representing weights of the neural network model, the initialization comprising determining values of the first parameter vector using random numbers generated based on the one or more seeds, the first parameter vector in a native parameter space;
- determining a number of dimensions for a smaller dimensional space corresponding to the native space, the number of dimensions of the smaller dimensional space being less than the number of dimensions of the native parameter space;
- determining a matrix, the size of the matrix based on the particular number of dimensions of the native parameter space and the number of dimensions of the smaller dimensional space, the determining of the matrix comprising determining elements of the matrix by generating random numbers based on the one or more seeds;
- training the neural network model by modifying parameter vectors in the smaller dimensional space, the smaller dimensional space representing a random subspace of the native parameter space by the matrix and the first parameter vector, the training generating a trained parameter vector in the smaller dimensional space which represents a trained native parameter vector in the random subspace;
- storing a compressed representation of the neural network model comprising one or more seeds and the trained parameter vector in the smaller dimensional space; and
- uncompressing the neural network model by determining the trained native parameter vector using the one or more seeds and the trained parameter vector in the smaller dimensional space.

23. The non-transitory computer readable storage medium of claim 22, wherein the training comprises:
- determining a gradient based on a current value of a parameter vector in the smaller dimensional space; and
- modifying the current parameter value of the parameter vector in the smaller dimensional space based on the gradient.

24. The non-transitory computer readable storage medium of claim 22, wherein instructions for determining the matrix comprise instructions for performing steps comprising:
- determining a first number of dimensions of the smaller dimensional space;
- determining a first matrix based on the first number of dimensions of the smaller dimensional space;
- determining that a first neural network model based on parameter vectors obtained from the first matrix fails to generate solutions;
- determining a second number of dimensions of the smaller dimensional space wherein the second number of dimensions is greater than the first number of dimensions;
- determining a second matrix based on the second number of dimensions of the smaller dimensional space; and
- determining whether a second neural network model based on parameter vectors obtained from the second matrix generates solutions.

25. The non-transitory computer readable storage medium of claim 24, wherein instructions for determining a matrix further comprise instructions for performing steps comprising:
- determining that the second neural network model based on parameter vectors obtained from the second matrix generates solutions;
- determining a third number of dimensions of the smaller dimensional space wherein the third number of dimensions is less than the second number of dimensions;
- determining a third matrix based on the third number of dimensions of the smaller dimensional space; and
- determining whether a third neural network model based on parameter vectors obtained from the third matrix generates solutions.

26. The non-transitory computer readable storage medium of claim 22, wherein the instructions further cause the one or more processors to perform the following step:
- transforming the matrix such that columns of transformed matrix are orthogonal and normalized to some predetermined length.

27. The non-transitory computer readable storage medium of claim 22, wherein the neural network model is configured to receive an image as input and generate a score based on the image.

28. The non-transitory computer readable storage medium of claim 22, wherein the neural network model is configured to receive sensor data captured by sensors of a vehicle, wherein a result of the neural network model is used for navigating the vehicle.

* * * * *